US007558248B2

(12) United States Patent
Ramanan et al.

(10) Patent No.: US 7,558,248 B2
(45) Date of Patent: *Jul. 7, 2009

(54) FANNING ROUTE GENERATION TECHNIQUE FOR MULTI-PATH NETWORKS

(75) Inventors: Aruna V. Ramanan, Poughkeepsie, NY (US); Bulent Abali, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 503 days.

This patent is subject to a terminal disclaimer.

(21) Appl. No.: 11/353,429

(22) Filed: Feb. 14, 2006

(65) Prior Publication Data

US 2006/0153180 A1    Jul. 13, 2006

Related U.S. Application Data

(63) Continuation of application No. 09/993,268, filed on Nov. 19, 2001, now Pat. No. 7,110,389.

(51) Int. Cl.
*H04L 12/28* (2006.01)
(52) U.S. Cl. .................... 370/351; 370/400; 370/386
(58) Field of Classification Search .............. 370/351, 370/357, 386, 389, 400; 709/238
See application file for complete search history.

(56) References Cited

U.S. PATENT DOCUMENTS

| | | | | |
|---|---|---|---|---|
| 4,987,536 A | 1/1991 | Humblet | .................. | 364/200 |
| 5,150,360 A | 9/1992 | Perlman et al. | ............ | 370/94.3 |
| 5,253,248 A | 10/1993 | Dravida et al. | ................ | 370/16 |
| 5,355,364 A | 10/1994 | Abali | .................. | 370/54 |
| 5,418,779 A | 5/1995 | Yemini et al. | ................. | 370/54 |
| 5,430,729 A | 7/1995 | Rahnema | .................. | 270/94.3 |
| 5,453,978 A | 9/1995 | Sethu et al. | .................. | 370/60 |
| 5,467,345 A | 11/1995 | Cutler, Jr. et al. | ............. | 370/60 |
| 5,521,910 A | 5/1996 | Matthews | .................. | 370/54 |
| 5,535,195 A | 7/1996 | Lee | .................. | 370/54 |

(Continued)

FOREIGN PATENT DOCUMENTS

JP          03-112238          5/1991

OTHER PUBLICATIONS

IBM Technical Disclosure Bulletin, "Algorithm for Random Selection of Shortest Path", vol. 32, No. 6A, Nov. 1989, pp. 478-480.

*Primary Examiner*—Seema S Rao
*Assistant Examiner*—Khoa Huynh
(74) *Attorney, Agent, or Firm*—Geraldine Monteleone, Esq.; Kevin P. Radigan, Esq.; Heslin Rothenberg Farley & Mesiti P.C.

(57) ABSTRACT

A fanning route generation technique is provided for multi-path networks having a shared communications fabric. The technique includes selecting a source node—destination node (S-D) group having common starting and ending sets of links from the network of interconnected nodes. Within this group, selecting the shortest routes between the S-D nodes of the group so that: selected routes substantially uniformly fan out from the source node to a center of the network and fan in from the center of the network to the destination node, thereby achieving local balance; and global balance of routes passing through links that are at a same level of the network is achieved.

21 Claims, 12 Drawing Sheets

U.S. PATENT DOCUMENTS

| | | | |
|---|---|---|---|
| 5,572,512 A | 11/1996 | Cutler, Jr. et al. | 370/13 |
| 5,596,722 A | 1/1997 | Rahnema | 395/200.15 |
| 5,812,549 A | 9/1998 | Sethu | 370/389 |
| 5,841,775 A | 11/1998 | Huang | 370/422 |
| 5,884,090 A | 3/1999 | Ramanan et al. | 395/800.13 |
| 6,021,442 A | 2/2000 | Ramanan et al. | 709/238 |
| 6,173,355 B1 | 1/2001 | Falik et al. | 710/129 |
| 6,314,084 B1 | 11/2001 | Kahale et al. | 370/230 |
| 6,498,778 B1 | 12/2002 | Cwilich et al. | 370/216 |
| 6,763,380 B1 | 7/2004 | Mayton et al. | 709/224 |
| 7,110,389 B2 * | 9/2006 | Ramanan et al. | 370/351 |
| 2004/0252694 A1 | 12/2004 | Adhikari et al. | 370/395.2 |

\* cited by examiner

FANNING ROUTE GENERATION TECHNIQUE FOR MULTI-PATH NETWORKS

CROSS-REFERENCE TO RELATED APPLICATION

This application is a continuation of co-pending U.S. patent application Ser. No. 09/993,268, filed Nov. 19, 2001, and entitled "Fanning Route Generation Technique for Multi-Path Networks", the entirety of which is hereby incorporated herein by reference.

TECHNICAL FIELD

The present invention relates generally to communications networks and multiprocessing systems or networks having a shared communications fabric. More particularly, the invention relates to a route generation technique for facilitating efficient routing of information between nodes of a multi-path network, and to the generation of routes that are both balanced globally and locally within the network.

BACKGROUND OF THE INVENTION

Parallel computer systems have proven to be an expedient solution for achieving greatly increased processing speeds heretofore beyond the capabilities of conventional computational architectures. With the advent of massively parallel processing machines such as the IBM RS/6000 SP1 and the IBM RS/6000 SP2, volumes of data may be efficiently managed and complex computations may be rapidly performed. (IBM and RS/6000 are registered trademarks of International Business Machines Corporation, Old Orchard Road, Armonk, N.Y., the assignee of the present application.)

A typical massively parallel processing system may include a relatively large number, often in the hundreds or even thousands of separate, though relatively simple, microprocessor-based nodes which are interconnected via a communications fabric comprising a high speed packet switch network. Messages in the form of packets are routed over the network between the nodes enabling communication therebetween. As one example, a node may comprise a microprocessor and associated support circuitry such as random access memory (RAM), read only memory (ROM), and input/output (I/O) circuitry which may further include a communications subsystem having an interface for enabling the node to communicate through the network.

Among the wide variety of available forms of packet networks currently available, perhaps the most traditional architecture implements a multi-stage interconnected arrangement of relatively small cross point switches, with each switch typically being an N-port bi-directional router where N is usually either 4 or 8, with each of the N ports internally interconnected via a cross point matrix. For purposes herein, the switch may be considered an 8 port router switch. In such a network, each switch in one stage, beginning at one side (so-called input side) of the network is interconnected through a unique path (typically a byte-wide physical connection) to a switch in the next succeeding stage, and so forth until the last stage is reached at an opposite side (so called output side) of the network. The bi-directional router switch included in this network is generally available as a single integrated circuit (i.e., a "switch chip") which is operationally non-blocking, and accordingly a popular design choice. Such a switch chip is described in U.S. Pat. No. 5,546,391 entitled "A Central Shared Queue Based Time Multiplexed Packet Switch With Deadlock Avoidance" by P. Hochschild et al., issued on Aug. 31, 1996.

A switching network typically comprises a number of these switch chips organized into two interconnected stages, for example; a four switch chip input stage followed by a four switch chip output stage, all of the eight switch chips being included on a single switch board. With such an arrangement, messages passing between any two ports on different switch chips in the input stage would first be routed through the switch chip in the input stage that contains the source or input port, to any of the four switches comprising the output stage and subsequently, through the switch chip in the output stage the message would be routed back (i.e., the message packet would reverse its direction) to the switch chip in the input stage including the destination (output) port for the message. Alternatively, in larger systems comprising a plurality of such switch boards, messages may be routed from a processing node, through a switch chip in the input stage of the switch board to a switch chip in the output stage of the switch board and from the output stage switch chip to another interconnected switch board (and thereon to a switch chip in the input stage). Within an exemplary switch board, switch chips that are directly linked to nodes are termed node switch chips (NSCs) and those which are connected directly to other switch boards are termed link switch chips (LSCs).

Switch boards of the type described above may simply interconnect a plurality of nodes, or alternatively, in larger systems, a plurality of interconnected switch boards may have their input stages connected to nodes and their output stages connected to other switch boards, these are termed node switch boards (NSBs). Even more complex switching networks may comprise intermediate stage switch boards which are interposed between and interconnect a plurality of NSBs. These intermediate switch boards (ISBs) serve as a conduit for routing message packets between nodes coupled to switches in a first and a second NSB.

Switching networks are described further in U.S. Pat. Nos. 6,021,442; 5,884,090; 5,812,549; 5,453,978; and 5,355,364, each of which is hereby incorporated herein by reference in its entirety.

One consideration in the operation of any switching network is that routes used to move messages should be selected such that a desired bandwidth is available for communication. One cause of loss of bandwidth is unbalanced distribution of routes between source-destination pairs and contention therebetween. While it is not possible to avoid contention for all traffic patterns, reduction of contention should be a goal. This goal can be partially achieved through generation of a globally balanced set of routes. The complexity of route generation depends on the type and size of the network as well as the number of routes used between any source-destination pair. Various techniques have been used for generating routes in a multi-path network. While some techniques generate routes dynamically, others generate static routes based on the connectivity of the network. Dynamic methods are often self-adjusting to variations in traffic patterns and tend to achieve as even a flow of traffic as possible. Static methods, on the other hand, are pre-computed and do not change during the normal operation of the network.

While pre-computing routing appears to be simpler, the burden of generating an acceptable set of routes that will be optimal for a variety of traffic patterns lies heavily on the algorithm that is used. Typically, global balancing of routes is addressed by these algorithms, while the issue of local balancing is overlooked, for example, because of the complexity involved.

Thus, a need remains in the art for a route generation technique that generates routes that are balanced both globally and locally in switching networks which support multiple paths between source-destination pairs.

SUMMARY OF THE INVENTION

The shortcomings of the prior art are overcome and additional advantages are provided through the provision of a method for generating routes for routing data packets in a network of interconnected nodes, wherein the nodes are at least partially interconnected by links. The method includes: selecting a source node-destination node (S-D) group with common starting and ending sets of links from the network of interconnected nodes; and selecting shortest routes between the S-D nodes of the S-D group so that the selected routes substantially uniformly fan out from the source nodes to a center of the network and fan in from the center of the network to the destination nodes, and global balance of routes passing through links that are at a same level of the network is achieved.

In enhanced aspects, the method includes repeating the selecting of the S-D group for a plurality of S-D groups from the network, and for each group, repeating selecting the shortest routes between S-D nodes of the group, wherein links within the network that are at a same level of the network have a substantially balanced number of routes passing therethrough, and are also locally balanced. In addition, the selecting of the S-D group may include selecting the S-D group to have at least one cross over link within an intermediate switch board (ISB) of the network disposed between the common starting and ending sets of links of the network. Further, the selecting can comprise selecting the shortest routes through the network by employing disjoint cross over links within the ISB(s).

Systems and computer program products corresponding to the above-summarized methods are also described and claimed herein.

To restate, provided herein is a fanning route generation technique for use in a communications network and/or multi processing system or any network having a shared communications network. Routes generated using the technique results in a reduced contention within the network, and hence improved available bandwidth for many traffic patterns. Further, the fanning route generation technique of the present invention will reduce, and sometimes even eliminate, available bandwidth differences among different communication groups within a network. Thus, routes generated using the technique provide a more uniform view of the system to the user, thereby easing node selection for obtaining optimal performance from, for example, jobs running on networked computing environments.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
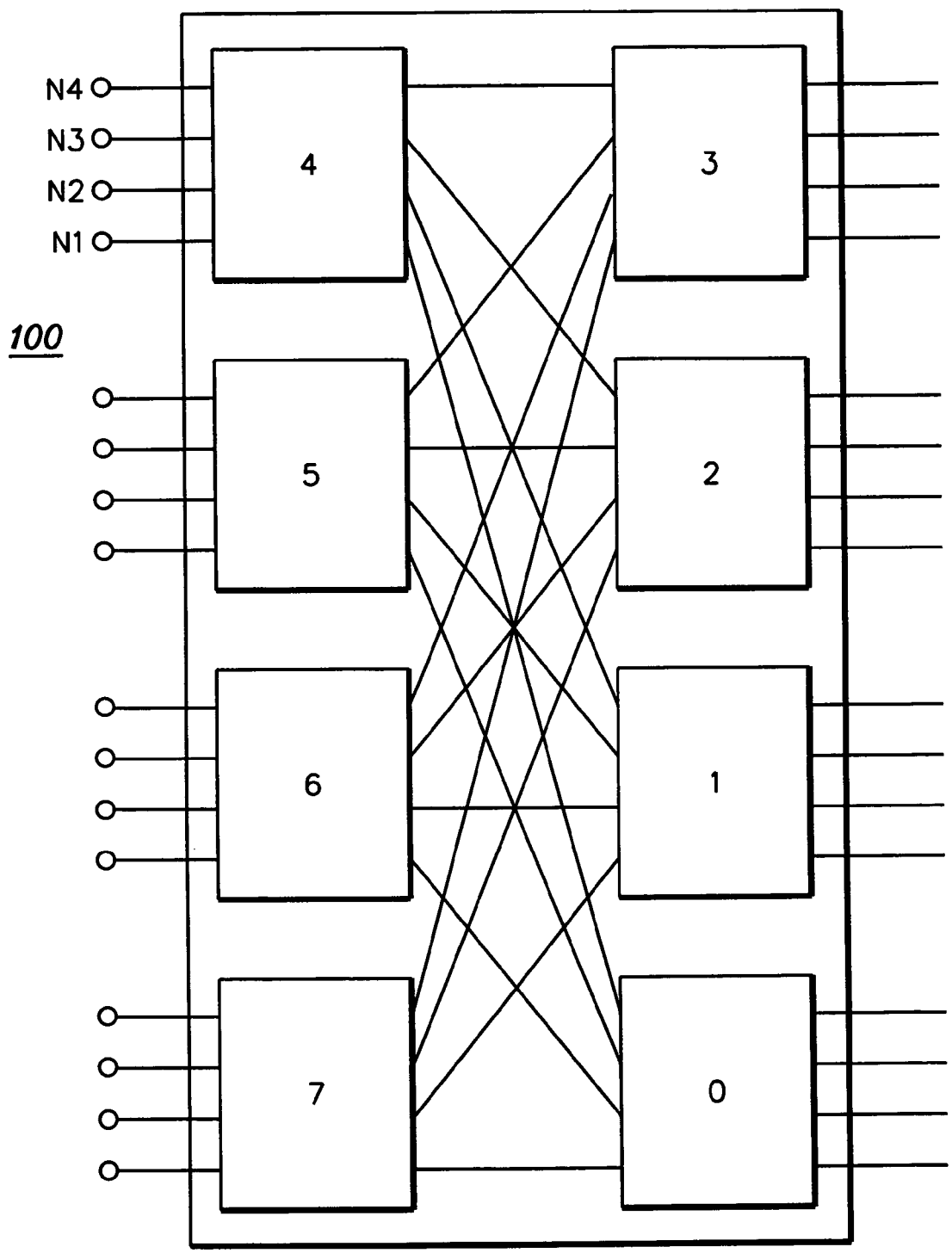
FIG. 1 depicts one embodiment of a switch board with eight switch chips, which can be employed in a communications network that is to utilize route generation in accordance with an aspect of the present invention.

Generally stated, presented herein is a route generation approach for generating balanced routes in networks having multiple paths between sources and destinations. One application of this fanning route generation technique to a bi-directional multi-stage packet-switch network is described below. Specifically, aspects of the present invention are illustratively described herein in the context of a massively parallel processing system, and particularly within an IBM SP2 high performance communication network employed within the SP family of Scalable Parallel Processing Systems manufactured by International Business Machines (IBM) Corporation of Armonk, N.Y.

In accordance with an aspect of the present invention, the fanning route generation technique presented herein dictates that selected routes are to fan out evenly from the sources and fan in evenly to the destinations, wherein both global and local balance of route loading is maintained on the intervening links of the network. This general concept is applicable irrespective of whether the cross points in the network are linked to sources and/or destinations, or the sources and destinations are located at the periphery of a complex network. This distribution of routes also assists in avoiding contentions for most traffic patterns, and helps to provide a uniform view of the system in regular networks.

Given that n routes are to be generated between each source-destination pair in a network, then the fanning route generation technique described herein dictates that fan out is to occur n ways on the available links from the source to the next set of cross points in the network. Similarly, fan in into the destination node occurs evenly from the last set of cross points leading to the destination node. This process continues until the routes meet at the center of the network. The routes will meet at the middle set of cross points when there are an even number of hops, or until they reach adjacent sets of cross points that can be directly linked to complete the route when there are an odd number of hops between source and destination. This process is applied to each source-destination pair, resulting in the links in the network being evenly used by the routes. One consideration in the selection of intermediate cross points is to have a minimum number of hops on the routes, and to achieve a low count of mutually exclusive routes and a low uniform probability of accessing the cross points, while maintaining the fanning condition.

As briefly noted, the fanning route generation technique of the present invention is described hereinbelow, by way of example, in connection with a multi-stage packet-switch network, and a comparison is provided against a well known route generation approach for the same network. The network that is analyzed is the switching network employed in IBM's SP systems. The nodes in an SP system are interconnected by a bi-directional multi-stage network. Each node sends and receives messages from other nodes in the form of packets. The source node incorporates the routing information into packet headers so that the switching elements can forward the packets along the right path to a destination. A Route Table Generator (RTG) implements the IBM SP2 approach to computing multiple paths (the standard is four) between all source-destination pairs. The RTG is conventionally based on a breadth first search algorithm.

Before proceeding further, certain terms employed in this description are defined:

SP System: For the purpose of this document, IBM's SP system means generally a set of nodes interconnected by a switch fabric.

Node: The term node refers to, e.g., processors that communicate amongst themselves through a switch fabric.

N-way System: An SP system is classified as an N-way system, where N is a maximum number of nodes that can be supported by the configuration.

Switch Fabric: The switch fabric is the set of switching elements or switch chips interconnected by communication links. Not all switch chips on the fabric are connected to nodes.

Switch Chip: A switch chip is, for example, an eight port cross-bar device with bi-directional ports that is capable of routing a packet entering through any of the eight input channels to any of the eight output channels.

Switch Board: Physically, a Switch Board is the basic unit of the switch fabric. It contains in one example eight switch chips. Depending on the configuration of the systems, a certain number of switch boards are linked together to form a switch fabric. Not all switch boards in the system may be directly linked to nodes.

Link: The term link is used to refer to a connection between two switch chips on the same board or on different switch boards.

Node Switch Board: Switch boards directly linked to nodes are called Node Switch Boards (NSBs). Up to 16 nodes can be linked to an NSB.

Intermediate Switch Board: Switch boards that link NSBs in large SP systems are referred to as Intermediate Switch Boards (ISBs). A node cannot be directly linked to an ISB. Systems with ISBs typically contain 4, 8 or 16 ISBs. An ISB can also be thought of generally as an intermediate stage.

Route: A route is a path between any pair of nodes in a system, including the switch chips and links as necessary.

Global Balance: A system is globally balanced if a same or substantially same number of routes pass through links that are at a same level of the network. That is, a globally balanced network is a network wherein links at the same level of the network carry a same static load.

Locally Balanced: As used herein, local balance refers to the spread of the source-destination pairs whose routes pass through an individual link of the network. Local balance means there is a substantially uniform selection of source-destination pairs whose routes pass through a link from a complete set of source-destination pairs whose routes can pass through a link.

One embodiment of a switch board, generally denoted 100, is depicted in FIG. 1. This switch board includes eight switch chips, labeled chip 0-chip 7. As one example, chips 4-7 are assumed to be linked to nodes, with four nodes (i.e., N1-N4) labeled. Since switch board 100 is assumed to connect to nodes, the switch board comprises a node switch board or NSB.

Figure 2:
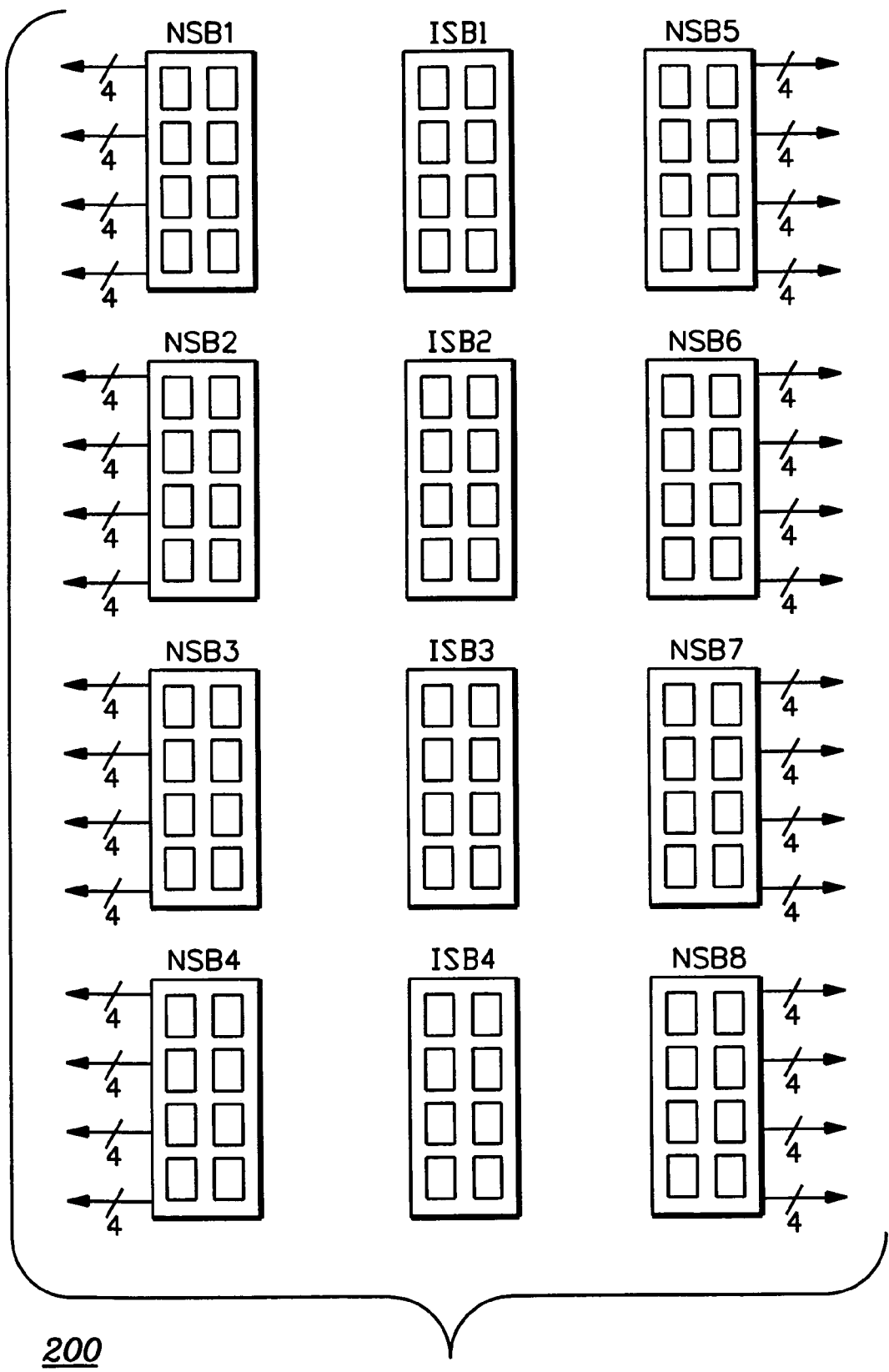
FIG. 2 depicts one logical layout of switch boards in a 128 node system to employ a fanning route generation technique in accordance with an aspect of the present invention.

FIG. 2 depicts one embodiment of a logical layout of switch boards in a 128 node system, generally denoted 200. Within system 200, switch boards connected to nodes are node switch boards (labeled NSB1-NSB8), while switch boards that link the NSBs are intermediate switch boards (labeled ISB1-ISB4). Each output of NSB1-NSB8 can actually connect to four nodes.

Figure 3:
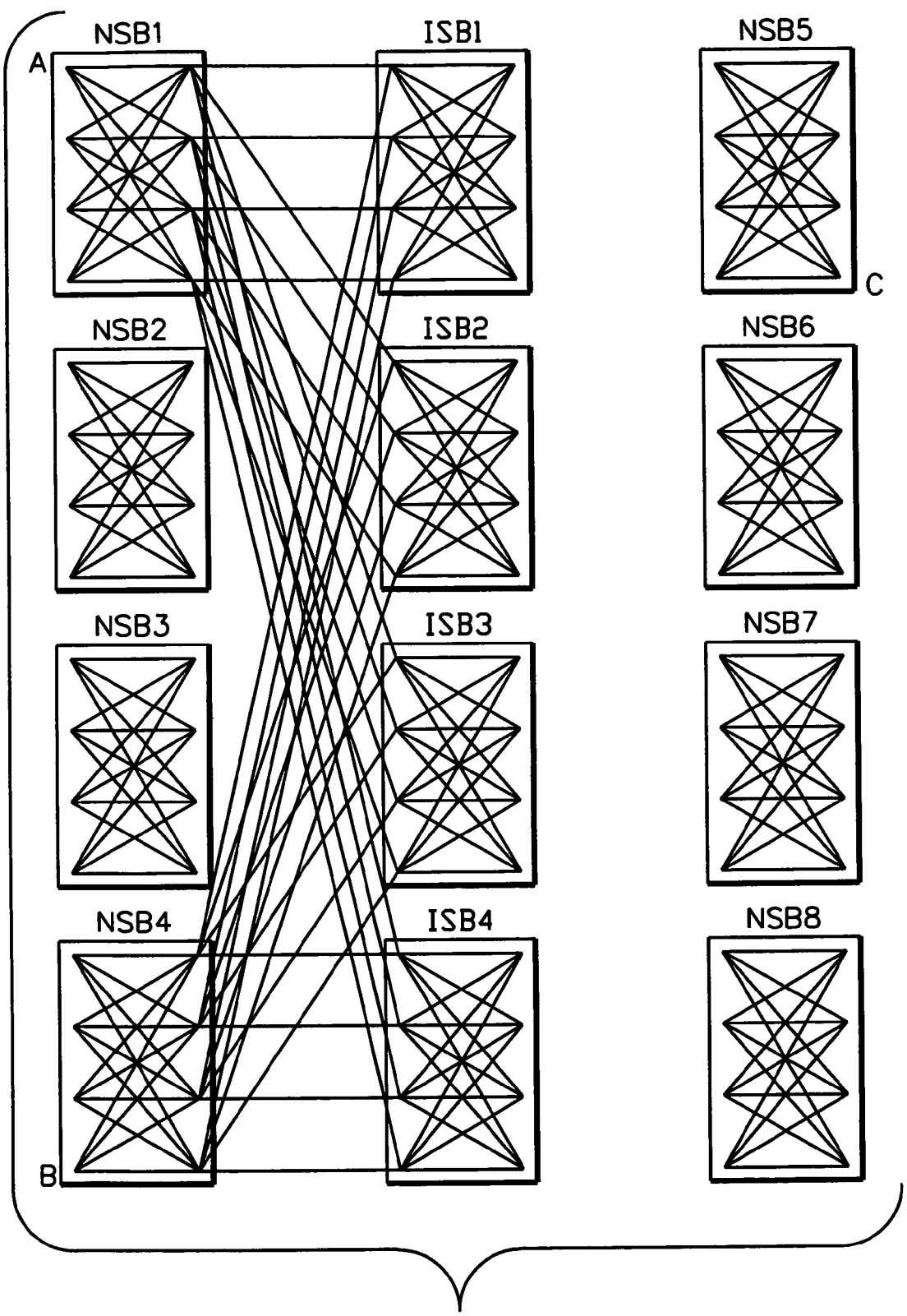
FIG. 3 depicts the 128 node system layout of FIG. 2 showing link connections between node switch board 1 (NSB1) and node switch board 4 (NSB4)
Figure 4:
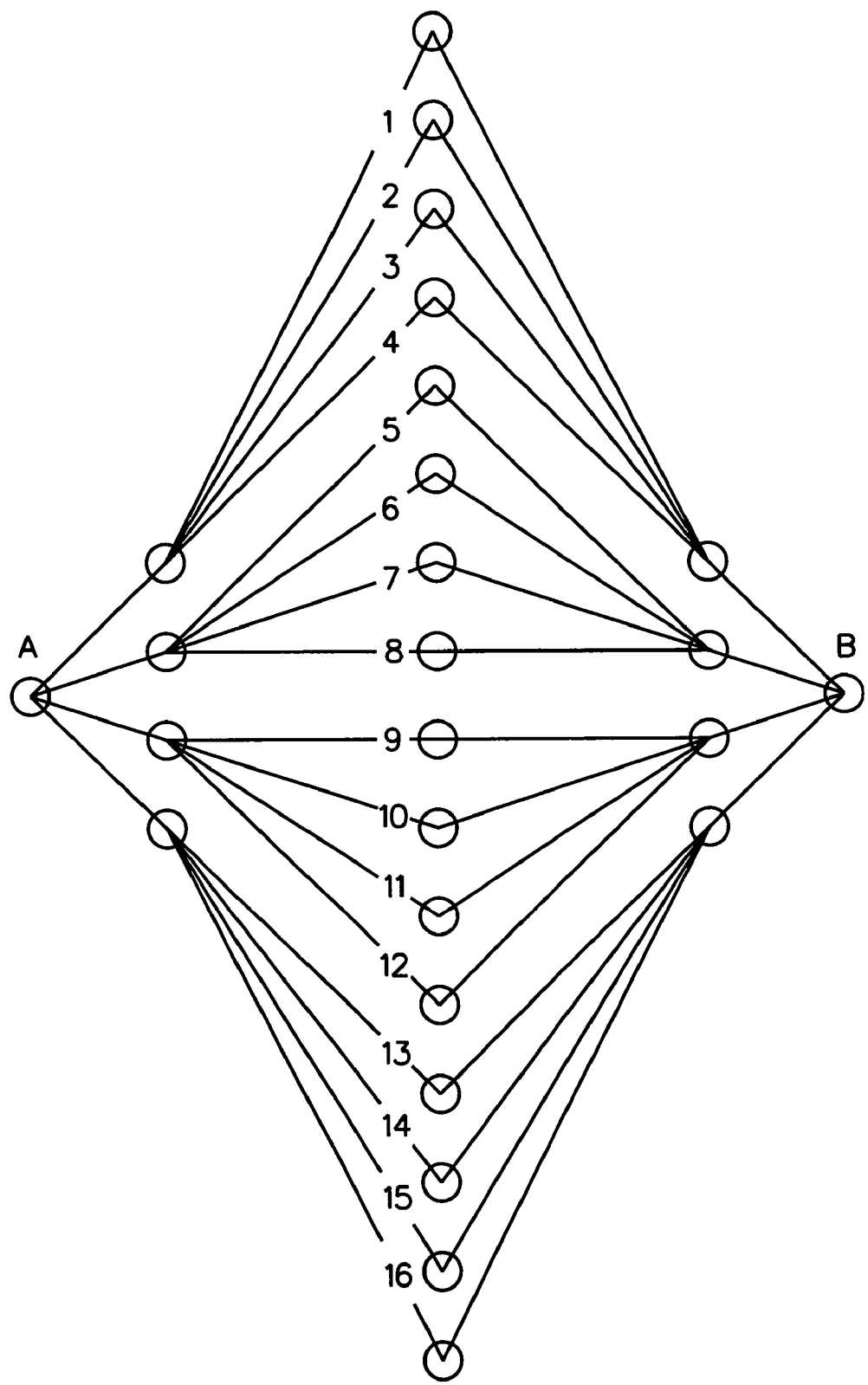
FIG. 4 depicts the 16 possible paths between a node on source group A and a node on destination group B of FIG. 3.

FIG. 3 depicts the 128 node layout of FIG. 2 showing link connections between NSB1 and NSB4. FIG. 4 is an extrapolation of the 16 paths between a node on source group A and a node on destination group B in FIG. 3. These paths are labeled 1-16, with each circle representing a switch chip within the switch network. As shown these 16 paths are disjoint at the center. So, routes from each source node on A will start on a different link from A and reach a destination node on B on a totally disjoint path. As many as four disjoint routes are generated when multiple routes are generated between any source on group A and any destination on group B. All routes between source group A and destination group B are evenly distributed over the 16 paths.

Figure 5:
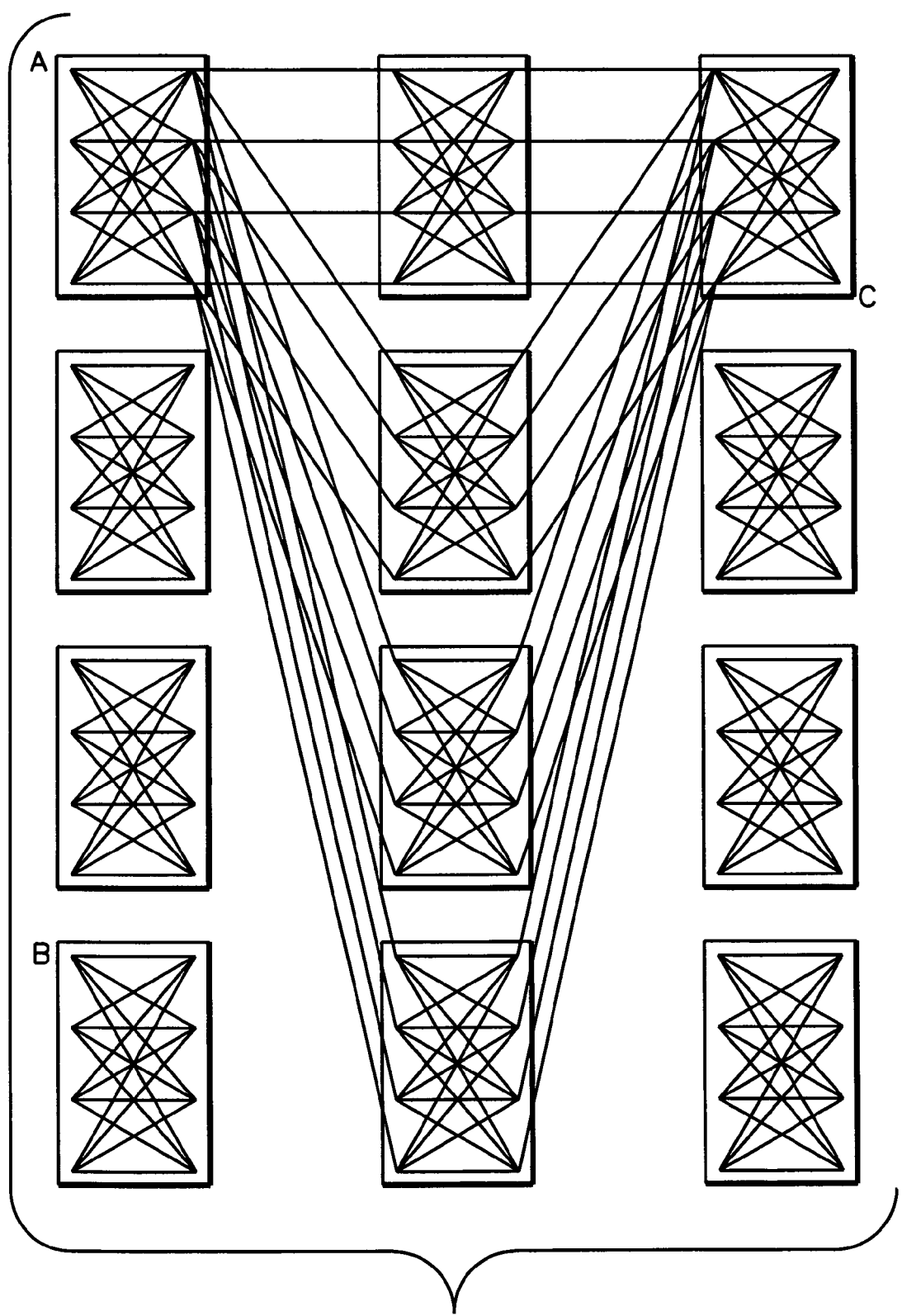
FIG. 5 depicts the 128 node system layout of FIG. 2 showing link connections between node switch board 1 (NSB 1) and node switch board 5 (NSB5)
Figure 6:
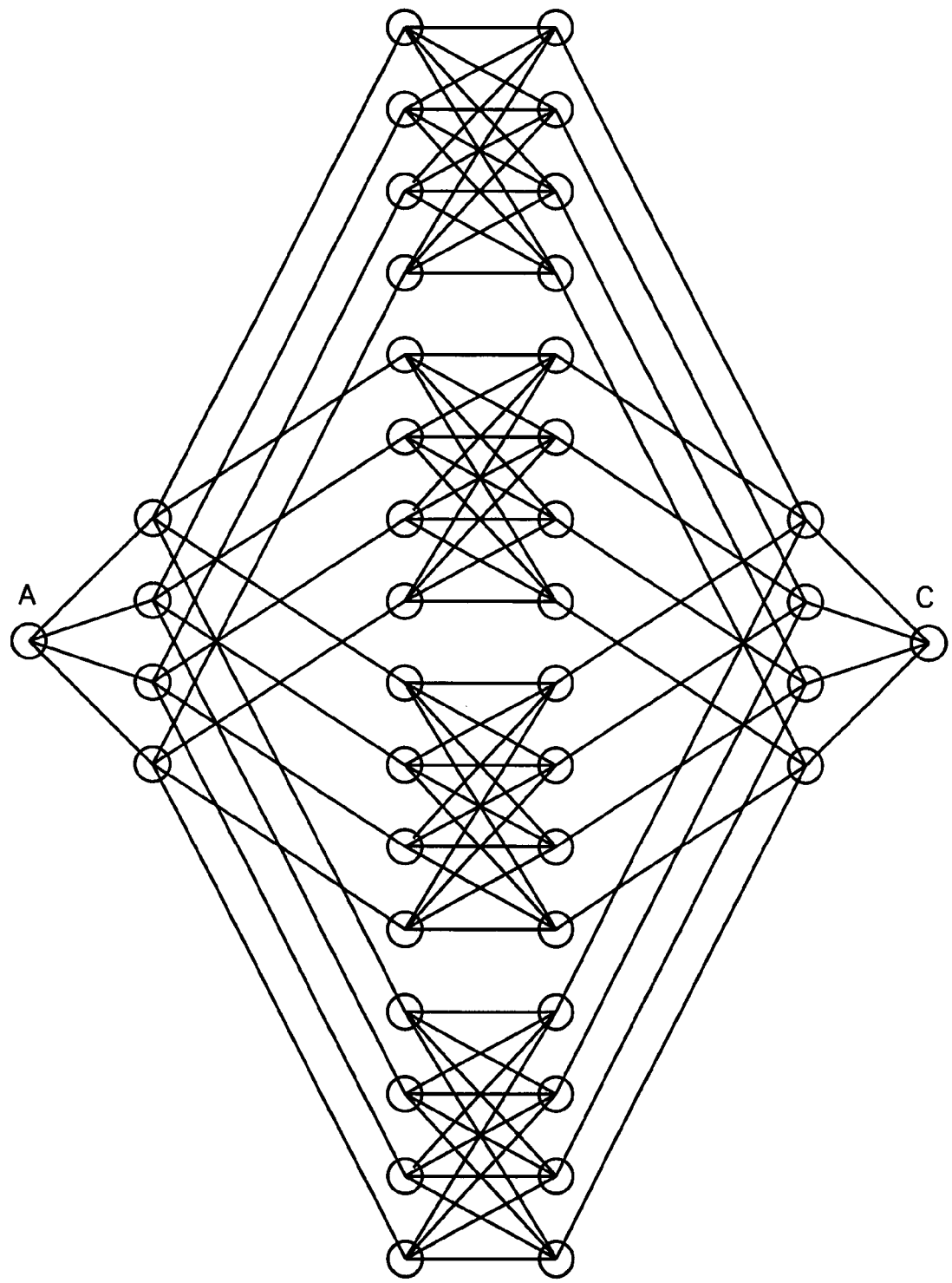
FIG. 6 depicts an abstraction of the network of FIG. 5 showing 64 possible paths between nodes on source group A and destination group C.

FIG. 5 depicts the 128 node layout of FIG. 2 showing link connections between NSB1 and NSB5. FIG. 6 depicts an abstraction of FIG. 5 showing 64 possible paths between a node on source group A and a node on destination group C. The number 64 originates with the fact that each of the 16 switch chips in the third column of FIG. 6 has four ways to reach the next column due to the cross connection between groups of four switch chips of a switch board, i.e., on the intermediate switch boards. Note that the circled switching points in FIG. 6 each represent a switch chip in the switch network. The source-destination pair A-C differs from that of A-B in that there is a cross connection in the middle of the network.

Figure 7:
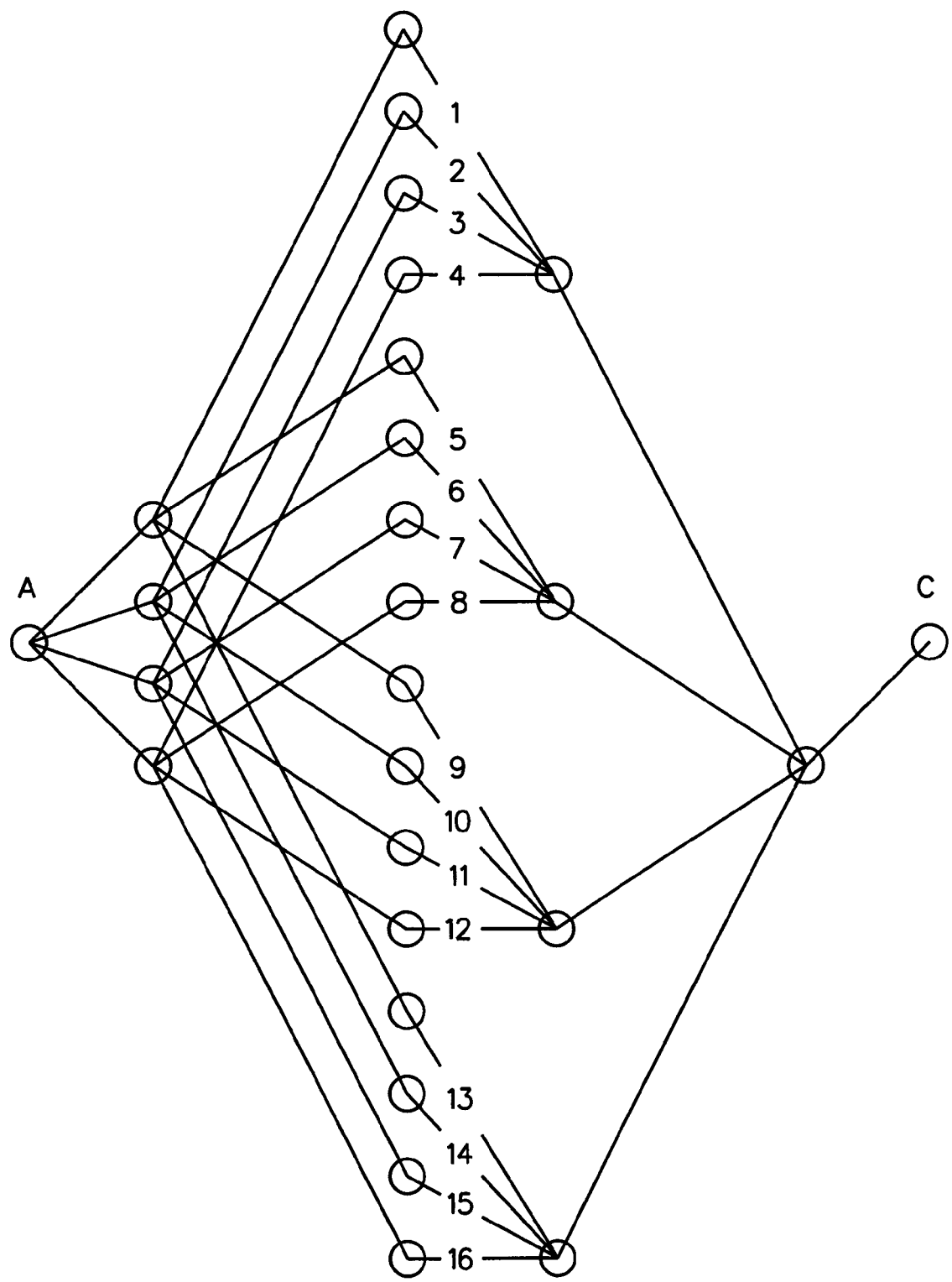
FIG. 7 depicts one example of 16 non-disjoint routes selected between nodes on source group A and destination group C by one conventional routing algorithm, such as described in the above-incorporated United States Letters Patents.

Since local balance is not a criterion of IBM's SP2 routing approach, the SP2 approach chooses the 16 paths shown in FIG. 7 for routing messages between a node on source A to a node on destination C. As shown, there are 16 non-disjoint paths selected between a node on source group A and a node on destination group C using the conventional SP2 style routing algorithm. These non-disjoint paths have been discovered to cause contention at the second to last stage from group C. In this example, all paths from A to C are fed through one link into C.

Essentially, what FIG. 7 illustrates is that if uniform spread or local balance is not addressed as a condition in selecting routes, it is possible to arrive at selections like the one of FIG. 7 made by the current SP2 approach. Thus, in one aspect, the present invention has a local balance condition that requires routes passing between groups of sources and destinations with the same starting and ending links to fan out uniformly from the sources and fan in uniformly into the destinations. By doing this, local balance is achieved.

Figure 8:
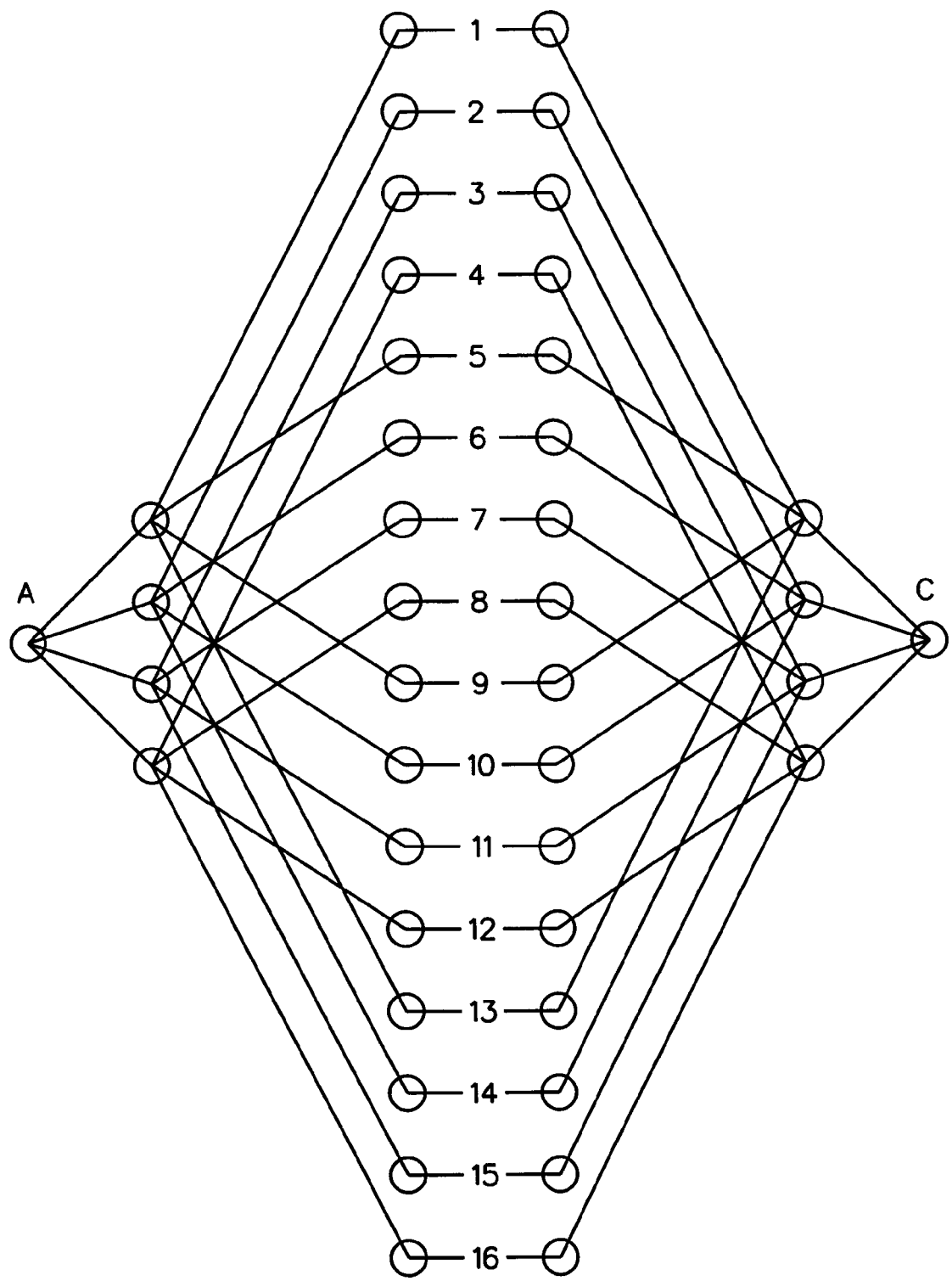
FIG. 8 depicts one example of 16 disjoint routes selected between nodes on source group A and destination group C by a fanning route generation technique in accordance with an aspect of the present invention.

FIG. 8 depicts one embodiment of the resultant distribution of routes employing the fanning route generation technique of the present invention. As shown in this figure, the technique spreads the routes on disjoint paths in the middle of the network and uses all four paths into C.

To summarize, IBM's SP2 route generation approach does ensure a global balance of routes on links that are at the same level of the network. For example, onboard links on NSBs are at one level, while NSB to ISB links are at a different level of the network. Global balance is achieved by ensuring that the same aggregate number of routes pass through links that are at the same level. The current SP approach does not care about the source-destination spread of these aggregate routes. As a result, the implementation produces routes, between certain groups of nodes, that overlap and cause contention in the network as shown in FIG. 7.

In accordance with an aspect of the present invention, a uniform spread or fanning of routes passing through a link or local balance is ensured by requiring that the routes between nodes on different switch chips be as disjoint as possible. This means that routes fan out from a source chip up to the middle of the network and then fan in to the destination chip. Such a dispersion, as shown in FIG. 8, ensures minimal contention during operation.

The Route Table Generator, of IBM's SP2 System, performs a breadth first search to allocate routes that balance the global weights on the links. The SP approach builds a spanning tree routed at each source node, and then uses the tree to define the desired number of shortest paths (with the standard being four) between the source node and each of the other destination nodes. In order to balance the loads on the links, the available switch ports on a switch chip are prioritized based on the weights on their outbound links, with higher priority being assigned for a link with lesser weight on it. When two or more outbound links have the same weight, the port with the smallest port number receives priority over the other links.

In contrast, the fanning route generation technique of the present invention can be implemented in many ways. One method involves creating routes that fan out from each source and each destination switch chip, and then join the routes through intervening switch chips while maintaining global balance of link weights. Once routes are fanned at the source and destination chips, the connectivity of the system will ensure that the shortest paths connecting the two ends of a route will be disjoined, thereby achieving local balance.

Another implementation of the invention is to modify the current IBM SP2 route generation approach to impose appropriate prioritizing rules for selection of the outbound links on intermediate switch chips so that the fanning condition is satisfied. The reason only intermediate switch chips need to be handled in this approach is because the fanning condition is satisfied at the starting switch chip by the current SP2 approach. The SP2 approach then chooses one of four ISBs to select routes between a pair of chips, such as A and C, on different sides of the network. Of the 16 paths within that ISB, the SP2 approach selects four paths that exit through the same switch chip on that ISB. These are either paths 1-4, or 5-8, or 9-12, or 13-16 of FIG. 7.

By applying a prioritizing condition to route selection on the first stage of chips on the ISBs, the fanning route generation technique of the present invention selects four paths that go through four different ISB chips to enter the destination NSB, as illustrated in FIG. 8. More particularly, in accordance with an aspect of the present invention, one of the four ISBs is still selected for routes between chip pairs A and C. The difference is that a set of four paths is selected within the ISB such that they are disjoint. A different ISB is chosen for a different source chip A on the same source switch board. Note that an assumption is made that a source list is constructed such that nodes are selected in order, i.e., all four nodes on the first switch chip, then all four nodes on the next switch chip, and so on. The source boards are also handled in sequence. The fanning route generation technique of the present invention ensures that destinations on the same switch chip are pushed in sequence so that they are processed in sequence. Also, the different destination switch chips are handled in sequence. Essentially, a set of four nodes that share the same source links are processed one after the other. During the processing of a source node, the set of four destination nodes that share the same destination links are processed one after the other. This will be better understood with reference to the processings of FIGS. 9-11. Again, while a 128 node SP network is used for illustration, the concepts disclosed herein are more general and are applicable to a variety of networks.

Figure 9:
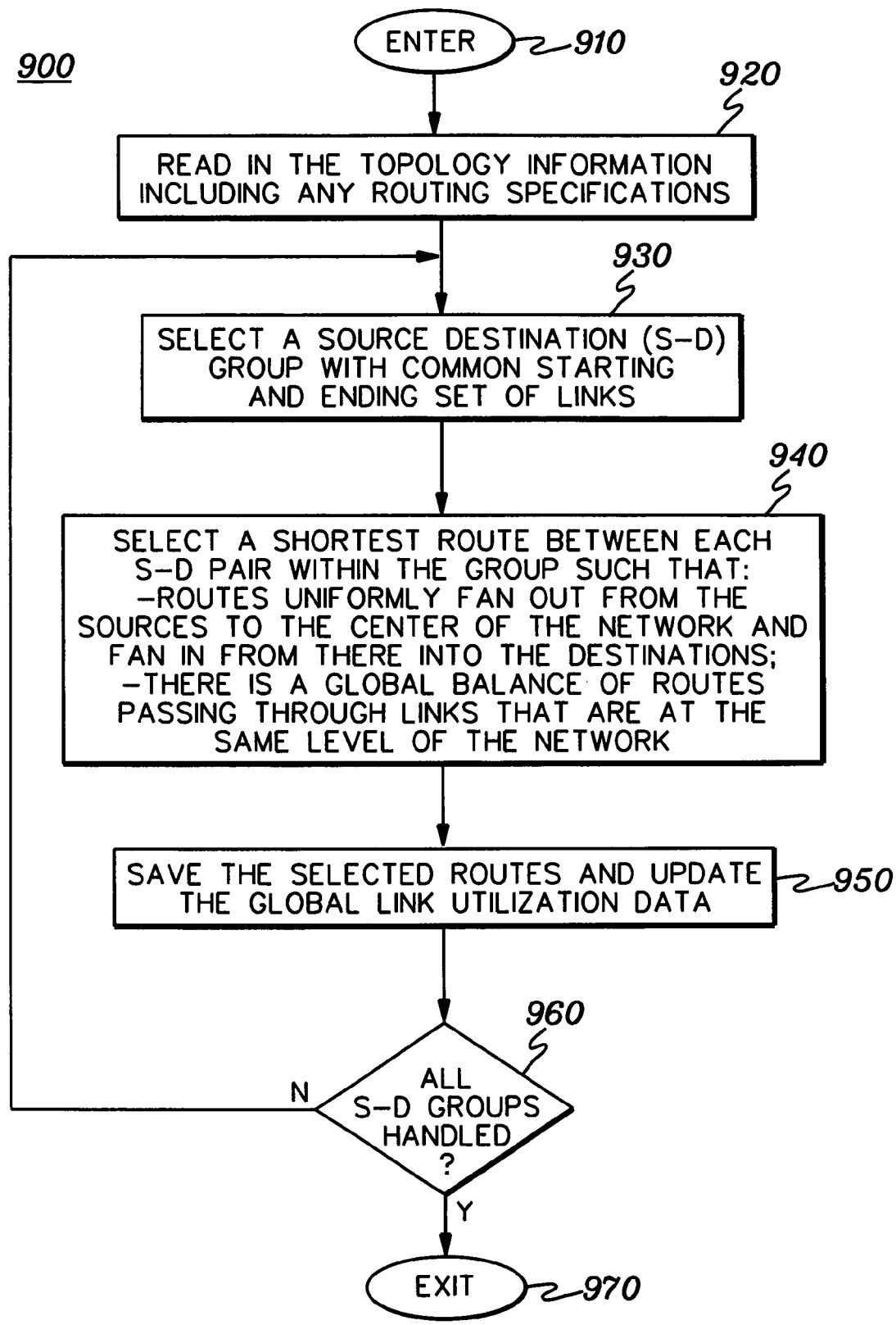
FIG. 9 is one flowchart embodiment of a fanning route generation technique in accordance with an aspect of the present invention.

FIG. 9 depicts an overview of a fanning route generation technique, generally denoted 900, in accordance with an aspect of the present invention. Upon beginning processing 910, network connection information is obtained by reading in the topology information, including any routing specifications 920. This information could either be provided in a file or passed in through a data structure. A source-destination (S-D) group with common starting and ending sets of links is selected 930, and the shortest routes are then selected between each S-D pair within the group such that the routes from the source on a switch chip uniformally spread out to the center of the network and then concentrate into the destination switch chip while maintaining a global balance of routes passing through links at the same level of the network 940. The selected routes are saved, and the global links utilization data is updated 950. Processing then determines whether all S-D groups have been handled 960 and continues to loop back to select a next S-D group until all S-D groups have been processed, after which processing exits the routine 970.

Figure 10A:
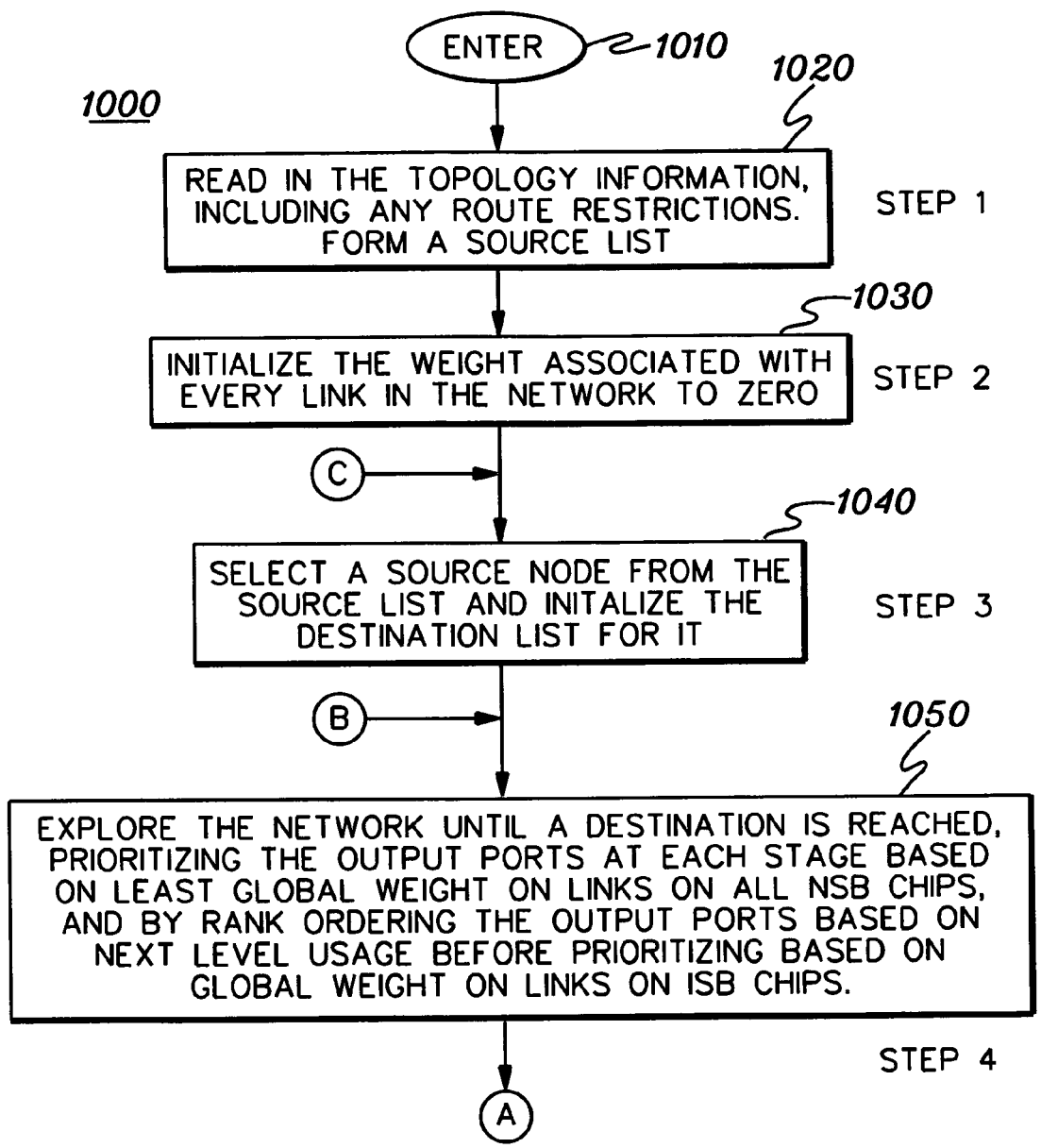
FIGS. 10A & 10B are a flowchart embodiment of a fanning route generation technique in accordance with an aspect of the present invention for implementation within an IBM SP system.
Figure 10B:
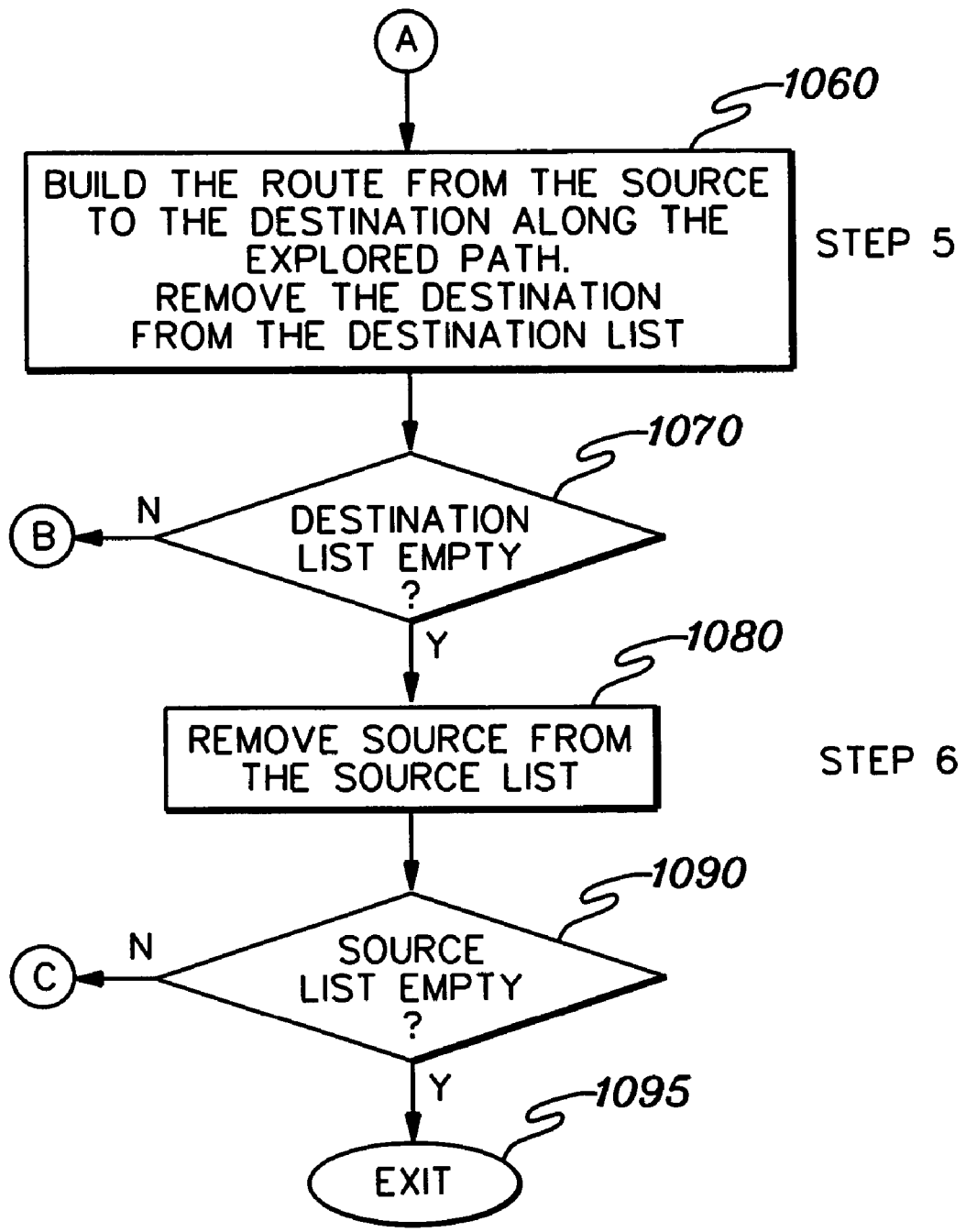

One application of a fanning route generation technique for an SP network is presented in FIGS. 10A & 10B in accordance with an aspect of the present invention. This processing, denoted 1000, begins 1010 by reading in the topology information, including any route restrictions. The SP network has some routing restrictions for certain configurations. A list of source nodes is then formed 1020 (STEP 1). Next, the global balance data is initialized by assigning a weight value of zero to all links in the network 1030 (STEP 2). A source node is selected from the source list and a list of destinations for that source node is formed 1040 (STEP 3).

The network is then explored until a destination node is reached. This exploration includes prioritizing the output ports at each stage based on least global weight on links for all NSB chips, and by rank ordering the output ports based on next level usage before prioritizing based on global weight on links for ISB chips 1050 (STEP 4). A detailed process implementation of STEP 4 is described further below with reference to FIG. 11.

Continuing with FIG. 10B, processing builds the route from the source to the destination along the explored path, and removes the destination from the destination list 1060

(STEP 5). Having handled the current destination, processing selects a next destination from the destination list 1070 and returns to explore the network for the new S-D pair. Once the destination list is empty for the selected source, the source is removed from the source list 1080 (STEP 6) and processing determines whether the source list is empty. If not, a new source is selected at STEP 3. Otherwise, processing is complete and the routine is exited 1095.

Figure 11:
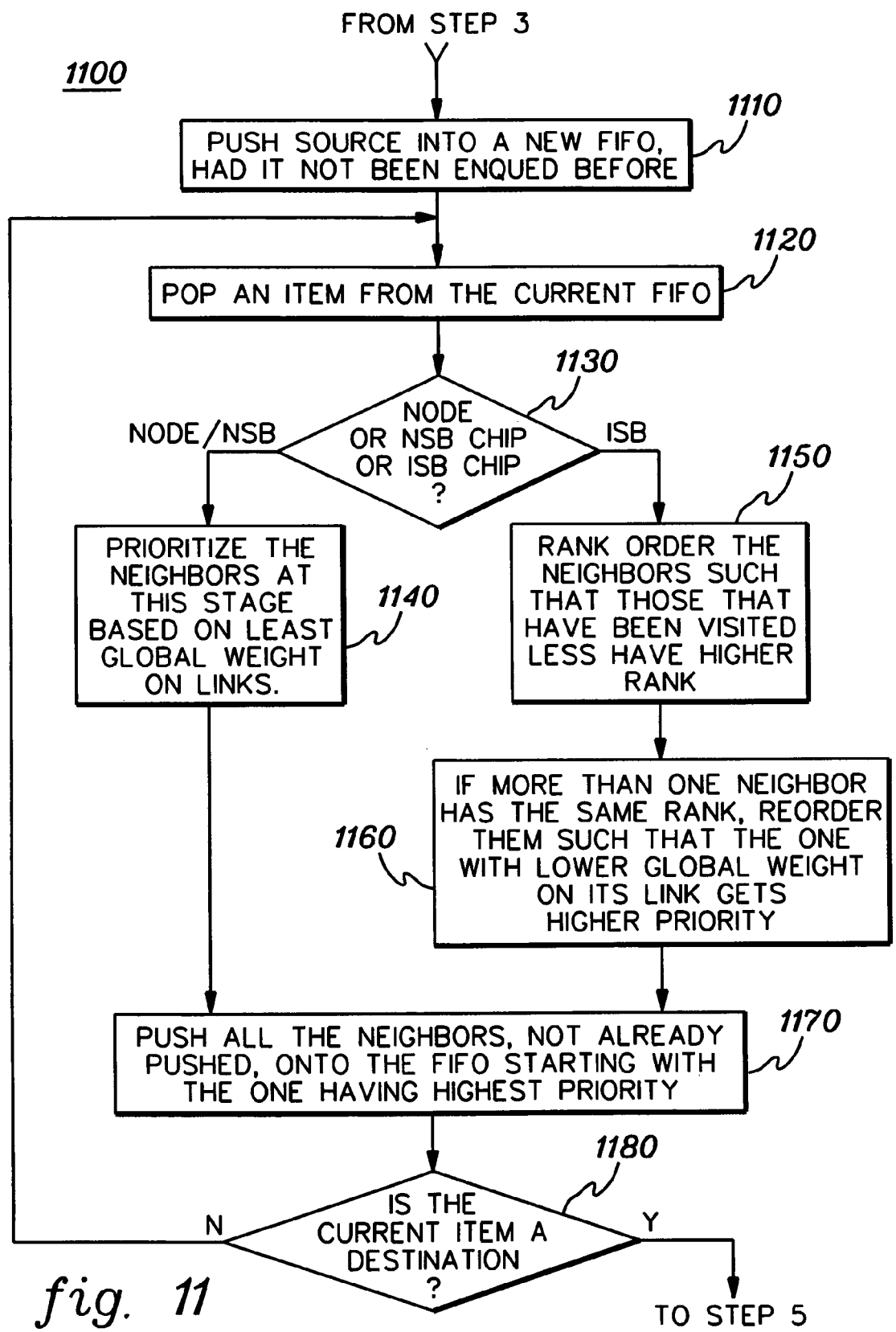
FIG. 11 is a flowchart of one embodiment of STEP 4 of the route generation technique of FIGS. 10A & 10B in accordance with an aspect of the present invention.

FIG. 11 provides additional implementation details of STEP 4 of the fanning route generation technique of FIGS. 10A & 10B. The exploration can be accomplished using a breadth first search implemented by maintaining a first in first out (FIFO) list of switch chips and nodes that are encountered while exploring the network. First, the source, a node, is pushed into the FIFO 1110. This first entry will also be the first entry removed from the FIFO 1120. Inquiry is then made whether the listing is a node, an NSB chip, or an ISB chip 1130. If a node or NSB chip, then processing prioritizes the neighbors (i.e., output ports) at this stage based on least global weight on the links connected to those ports 1140. Since the listing from the FIFO comprises a node, decision 1130 indicates that the node has only one neighbor which is the switch chip attached to it. That switch chip is pushed into the FIFO since it has not been handled yet 1170. The source is also a destination for itself; so the route for itself is generated. The destination list is not empty yet 1180, so processing loops back. The switch chip linked to the source is removed from the FIFO. No weights have been assigned yet to the links out of the switch chip, so they are prioritized starting, for example, with the link on port 0 to the link on port 7. All but the source node will be pushed into the FIFO. The source node is not pushed into the FIFO since it has already been processed. This item, the switch chip, is not a destination. So the algorithm loops back to remove the next item from the FIFO. Whenever a node is popped out from the FIFO, its neighbor would have been already handled. The exploration information is utilized to form the route between the source and the destination.

If the item removed is an ISB chip, then rank ordering of neighbors is employed, wherein ports that have been visited less have a higher rank 1150. If more than one neighbor has the same rank, then the ranks are reordered with the one with the lowest global weight on its link receiving highest priority 1160. All neighbors not already in the FIFO are added to the FIFO starting with the one having the highest priority 1170.

While visiting NSB chips that have already been visited during processing of another source, certain output links may have a weight on them. If so, the output links are ordered in such a way that the one with the least weight will have higher priority for next selection. If two links have the same weight, then the one link with the smaller port identifier will get the higher priority. It can be easily seen that the output links on board from a source switch chip will be used in cyclic order while implementing the technique of the present invention, thereby satisfying the fanning condition. The same is true of the second stage of switch chips on the NSBs. While processing the NSB chips on the destination side, prioritizing does not have any effect other than reaching the destinations in some order. This is because the route to a particular destination from the middle of the network does not have any choice of paths.

If the same approach to prioritization is used on the ISB chips, there is a possibility for concentration of routes on the same links. FIG. 7 shows the 16 paths that will be selected by IBM's current SP2 algorithm between sources on chip A and destinations on chip C. If the source chip identifier is 4, then it will choose paths 1, 2, 3 and 4 to go to destinations on any of the destination chips 4-7. Likewise, source chip 5 would choose paths 5-8, source chip 6 would choose paths 9-12, and source chip 7 would choose paths 13-16. If multiple routes are desired, these would be permuted for each of the desired paths. When all the routes are generated for the system, there will be a global balance of weights on links.

FIG. 8 depicts the 16 paths that are selected using the fanning route generation technique of the present invention. The rank ordering and prioritization condition of the fanning approach of FIGS. 9-11, will select a different set of disjoint links between the two stages of ISB chips on an ISB while processing source chips on different NSBs, and ensure that all 16 links on an ISB are used for providing global balance at this level of links. Since the concentration onto the outgoing ISB chips is avoided, the fanning condition is satisfied.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for generating routes for routing data packets in a network of interconnected nodes, the nodes being at least partially interconnected by links, the method comprising:

generating static path, source-based routes for routing data packets in the network of interconnected nodes, the generating of static path, source-based routes comprising:
(i) selecting a source node-destination node (S-D) group with common starting and ending sets of links from the network of interconnected nodes;
(ii) selecting shortest static path, source-based routes between at least some S-D node pairs of the S-D group so that:
(a) selected static path, source-based routes substantially uniformly fan out from the source nodes to a center of the network and fan in from the center of the network to the destination nodes;
(b) local balance of static path, source-based routes between selected S-D node pairs of the S-D group passing through links that are at the same level of the network is achieved, wherein local balance means that there is a substantially uniform selection of S-D node pairs whose routes pass through a link from a complete set of S-D node pairs whose routes can pass through the link; and
(c) global balance of static path, source-based routes passing through links that are at the same level of the network is achieved, wherein global balance means that links at a same level of the network carry a same static load.

2. The method of claim 1, further comprising repeating said selecting (i) of the S-D group for a plurality of S-D groups from the network, and for each S-D group, selecting (ii) the shortest routes between S-D node pairs of the group so that (a) & (b) & (c) are met, wherein links within the network that are at a same level of the network have a substantially balanced number of routes passing therethrough and are locally balanced.

3. The method of claim 1, wherein said selecting (ii) comprises exploring the network from a source node until a destination node is reached, and for each S-D node pair of the group, prioritizing output ports at each stage based on least global weight of links on a node switch board (NSB), and by rank ordering output ports based on next level usage before prioritizing based on global weight of links on an intermediate switch board (ISB).

4. The method of claim 3, wherein said selecting (ii) further comprises building the shortest routes between S-D node pairs of the S-D group employing said prioritizing and said rank ordering.

5. The method of claim 1, wherein said selecting (ii) comprises selecting the shortest routes without prior knowledge of the type of data packages to be forwarded across said routes.

6. The method of claim 1, wherein said selecting (i) further comprises selecting an S-D group with at least one cross connection within an intermediate switch board (ISB) disposed between the common starting and ending sets of links of the network of interconnected nodes.

7. The method of claim 6, wherein said selecting (ii) comprises selecting said shortest routes by employing cross connected links within the ISB that are disjoint.

8. A system for generating routes for routing data packets in a network of interconnected nodes, the nodes being at least partially interconnected by links, the system comprising:
  means for generating static path, source-based routes for routing data packets in the network of interconnected nodes, the generating of static path, source-based routes comprising:
    (i) means for selecting a source node—destination node (S-D) group with common starting and ending sets of links from the network of interconnected nodes;
    (ii) means for selecting shortest static path, source-based routes between at least some S-D node pairs of the S-D group so that:
      (a) selected static path, source-based routes substantially uniformly fan out from the source nodes to a center of the network and fan in from the center of the network to the destination nodes;
      (b) local balance of static path, source-based routes between selected S-D node pairs of the S-D group passing through links that are at the same level of the network is achieved, wherein local balance means that there is a substantially uniform selection of S-D node pairs whose routes pass through a link from a complete set of S-D node pairs whose routes can pass through the link; and
      (c) global balance of static path, source-based routes passing through links that are at a same level of the network is achieved, wherein global balance means that links at a same level of the network carry a same static load.

9. The system of claim 8, further comprising means for repeating said means for selecting (i) of the S-D group for a plurality of S-D groups from the network, and for each S-D group, means for selecting (ii) the shortest routes between S-D node pairs of the group so that (a) & (b) & (c) are met, wherein links within the network that are at a same level of the network have a substantially balanced number of routes passing therethrough and are locally balanced.

10. The system of claim 8, wherein said means for selecting (ii) comprises means for exploring the network from a source node until a destination node is reached, and for each S-D node pair of the group, means for prioritizing output ports at each stage based on least global weight of links on a node switch board (NSB), and by rank ordering output ports based on next level usage before prioritizing based on global weight of links on an intermediate switch board (ISB).

11. The system of claim 10, wherein said means for selecting (ii) further comprises means for building the shortest routes between S-D node pairs of the S-D group employing said prioritizing and said rank ordering.

12. The system of claim 8, wherein said means for selecting (ii) comprises means for selecting the shortest routes without prior knowledge of the type of data packages to be forwarded across said routes.

13. The system of claim 8, wherein said means for selecting (i) further comprises means for selecting an S-D group with at least one cross connection within an intermediate switch board (ISB) disposed between the common starting and ending sets of links of the network of interconnected nodes.

14. The system of claim 13, wherein said means for selecting (ii) comprises means for selecting said shortest routes by employing cross connected links within the ISB that are disjoint.

15. At least one program storage device readable by a machine, tangibly embodying at least one program of instructions executable by the machine to perform a method of generating routes for routing data packets in a network of interconnected nodes, the nodes being at least partially interconnected by links, the method comprising:
  generating static path, source-based routes for routing data packets in the network of interconnected nodes, the generating of static path, source-based routes comprising:
    (i) selecting a source node-destination node (S-D) group with common starting and ending sets of links from the network of interconnected nodes;
    (ii) selecting shortest static path, source-based routes between at least some S-D node pairs of the S-D group so that:
      (a) selected static path, source-based routes substantially uniformly fan out from the source nodes to a center of the network and fan in from the center of the network to the destination nodes;
      (b) local balance of static path, source-based routes between selected S-D node pairs of the S-D group passing through links that are at the same level of the network is achieved, wherein local balance means that there is a substantially uniform selection of S-D node pairs whose routes pass through a link from a complete set of S-D node pairs whose routes can pass through the link; and
      (c) global balance of static path, source-based routes passing through links that are at the same level of the network is achieved, wherein global balance means that links at a same level of the network carry a same static load.

16. The at least one program storage device of claim 15, further comprising repeating said selecting (i) of the S-D group for a plurality of S-D groups from the network, and for each S-D group, selecting (ii) the shortest routes between S-D node pairs of the group so that (a) & (b) & (c) are met, wherein links within the network that are at a same level of the network have a substantially balanced number of routes passing therethrough and are locally balanced.

17. The at least one program storage device of claim 15, wherein said selecting (ii) comprises exploring the network from a source node until a destination node is reached, and for each S-D node pair of the group, prioritizing output ports at each stage based on least global weight of links on a node switch board (NSB), and by rank ordering output ports based on next level usage before prioritizing based on global weight of links on an intermediate switch board (ISB).

18. The at least one program storage device of claim 17, wherein said selecting (ii) further comprises building the shortest routes between S-D node pairs of the S-D group employing said prioritizing and said rank ordering.

19. The at least one program storage device of claim 15, wherein said selecting (ii) comprises selecting the shortest routes without prior knowledge of the type of data packages to be forwarded across said routes.

20. The at least one program storage device of claim 15, wherein said selecting (i) further comprises selecting an S-D group with at least one cross connection within an intermediate switch board (ISB) disposed between the common starting and ending sets of links of the network of interconnected nodes.

21. The at least one program storage device of claim 20, wherein said selecting (ii) comprises selecting said shortest routes by employing cross connected links within the ISB that are disjoint.

* * * * *